United States Patent
Martin et al.

(10) Patent No.: US 10,152,234 B1
(45) Date of Patent: Dec. 11, 2018

(54) VIRTUAL VOLUME VIRTUAL DESKTOP INFRASTRUCTURE IMPLEMENTATION USING A PRIMARY STORAGE ARRAY LACKING DATA DEDUPLICATION CAPABILITY

(71) Applicant: EMC IP HOLDING COMPANY LLC, Hopkinton, MA (US)

(72) Inventors: Owen Martin, Hopedale, MA (US); Mario Würzl, Hopkinton, MA (US); Arieh Don, Newton, MA (US); Thomas F. O'Neill, Acton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 102 days.

(21) Appl. No.: 15/496,084

(22) Filed: Apr. 25, 2017

(51) Int. Cl.
*G06F 3/06* (2006.01)

(52) U.S. Cl.
CPC .......... *G06F 3/0608* (2013.01); *G06F 3/0604* (2013.01); *G06F 3/0631* (2013.01); *G06F 3/0652* (2013.01); *G06F 3/0665* (2013.01); *G06F 3/0683* (2013.01)

(58) Field of Classification Search
CPC .... G06F 3/0608; G06F 3/0604; G06F 3/0631; G06F 3/0652; G06F 3/0665; G06F 3/0683
See application file for complete search history.

(56) References Cited

U.S. PATENT DOCUMENTS

| | | | |
|---|---|---|---|
| 8,572,338 B1 * | 10/2013 | Marathe | G06F 3/067 711/162 |
| 8,719,540 B1 * | 5/2014 | Miller | G06F 3/0619 711/173 |
| 10,078,583 B1 * | 9/2018 | Wallace | G06F 12/0253 |
| 2007/0226446 A1 * | 9/2007 | Horiuchi | G06F 11/2069 711/170 |
| 2012/0136841 A1 * | 5/2012 | Ambat | G06F 3/0608 707/692 |

* cited by examiner

*Primary Examiner* — Hiep T Nguyen
(74) *Attorney, Agent, or Firm* — Anderson Gorecki LLP

(57) ABSTRACT

A virtualized storage array provides deduplication for a primary storage array that supports VVOLs. The VVOLs may be created for VMs that support host applications and guest OSs in a VDI environment. A VVOL is initially created as a virtualized managed drive that is backed by the virtualized storage array. The data is deduped by the virtualized storage array. After deduplication the data is either maintained on the virtualized storage array or moved to the primary storage array based on satisfying deduplication criteria such as reduction ratio.

20 Claims, 5 Drawing Sheets

VIRTUAL VOLUME VIRTUAL DESKTOP INFRASTRUCTURE IMPLEMENTATION USING A PRIMARY STORAGE ARRAY LACKING DATA DEDUPLICATION CAPABILITY

BACKGROUND

The subject matter of this disclosure is generally related to computer networks in which a data storage system maintains data for multiple host servers and concurrent users. Host servers run data processing applications that may be referred to as host applications. Host application data may be maintained on tangible data storage drives that are managed by storage arrays. The storage arrays may present the storage resources of the drives to the host servers as logical storage devices. The host servers may access the host application data by sending IOs with reference to the logical storage devices. The storage arrays implement the IOs by accessing the tangible data storage drives based on a mapping between the logical storage devices and the tangible storage drives.

SUMMARY

All examples, aspects and features mentioned in this document can be combined in any technically possible way.

In accordance with an aspect, an apparatus comprises: a primary storage array comprising: a plurality of computing nodes; a plurality of managed drives, each managed drive comprising non-volatile storage; at least one protocol endpoint associated with a device number; and a virtual volume of storage that is uniquely associated with a protocol endpoint of the primary storage array and a sub-address, the protocol endpoint having a device number, the device number and the sub-address uniquely associated with a virtual machine running on a host computer such that the device number and the sub-address distinguish the virtual volume of storage from other virtual volumes of storage associated with the device number; and a virtualized storage array comprising: a plurality of computing nodes; a plurality of managed drives, each managed drive comprising non-volatile storage; a deduplication algorithm; and a virtualized device that is backed by the managed drives of the virtualized storage device; wherein data of the virtual volume of storage is maintained on the virtualized device and deduped by the deduplication algorithm. Some implementations comprise deduplication information that is provided to the primary storage array by the virtualized storage array, the deduplication information indicative of suitability of the data for deduplication. Some implementations comprise a data placement program running on the primary storage array, the data placement program using the deduplication information to determine whether to maintain the data on the virtualized storage array or the primary storage array. In some implementations the deduplication information comprises at least one of size reduction percentage and reduction ratio. In some implementations the data remains on the virtualized storage array because the deduplication information satisfies predetermined criteria. In some implementations the data is moved to the primary storage array because the deduplication information fails to satisfy predetermined criteria. In some implementations the logical device is deleted from the virtualized storage array.

In accordance with an aspect a method comprises: on a primary storage array, creating a virtual volume of storage that is uniquely associated with a protocol endpoint of the primary storage array and a sub-address, the protocol endpoint having a device number, the device number and the sub-address uniquely associated with a virtual machine running on a host computer such that the device number and the sub-address distinguish the virtual volume of storage from other virtual volumes of storage associated with the device number; storing data of the virtual volume of storage on a virtualized device of a virtualized storage array; and processing the data in the virtualized storage array with a deduplication algorithm. Some implementations comprise providing deduplication information to the primary storage array by the virtualized storage array, the deduplication information indicative of suitability of the data for deduplication. Some implementations comprise a data placement program running on the primary storage array using the deduplication information to determine whether to maintain the data on the virtualized storage array or the primary storage array. Some implementations comprise causing the data to remain on the virtualized storage array in response to the deduplication information satisfying predetermined criteria. Some implementations comprise causing the data to be moved from the virtualized storage array to the primary storage array in response to the deduplication information failing to satisfy predetermined criteria. Some implementations comprise deleting the logical device from the virtualized storage array after moving the data.

In accordance with an aspect an apparatus comprises: a host computer comprising a plurality of virtual machines, each virtual machine supporting a guest operating system that is part of a virtual desktop infrastructure for a client computer; a primary storage array comprising: a plurality of computing nodes; a plurality of managed drives, each managed drive comprising non-volatile storage; at least one protocol endpoint associated with a device number; and a virtual volume of storage that is uniquely associated with a protocol endpoint of the primary storage array and a sub-address, the protocol endpoint having a device number, the device number and the sub-address uniquely associated with a virtual machine running on a host computer such that the device number and the sub-address distinguish the virtual volume of storage from other virtual volumes of storage associated with the device number; and a virtualized storage array comprising: a plurality of computing nodes; a plurality of managed drives, each managed drive comprising non-volatile storage; a deduplication algorithm; and a virtualized device that is backed by the managed drives of the virtualized storage device; wherein guest operating system data of the virtual volume of storage is maintained on the virtualized device and deduped by the deduplication algorithm. Some implementations comprise deduplication information that is provided to the primary storage array by the virtualized storage array, the deduplication information indicative of suitability of the guest operating system data for deduplication. Some implementations comprise a data placement program running on the primary storage array, the data placement program using the deduplication information to determine whether to maintain the guest operating system data on the virtualized storage array or the primary storage array. In some implementations the deduplication information comprises at least one of size reduction percentage and reduction ratio. In some implementations the guest operating system data remains on the virtualized storage array because the deduplication information satisfies predetermined criteria. In some implementations the guest operating system data is moved to the primary storage array because the deduplication information fails to satisfy predetermined criteria. In some implementations the logical device is deleted from the virtualized storage array.

Other aspects, features and implementations may become apparent in view of the detailed description and figures.

DETAILED DESCRIPTION

Figure 1:
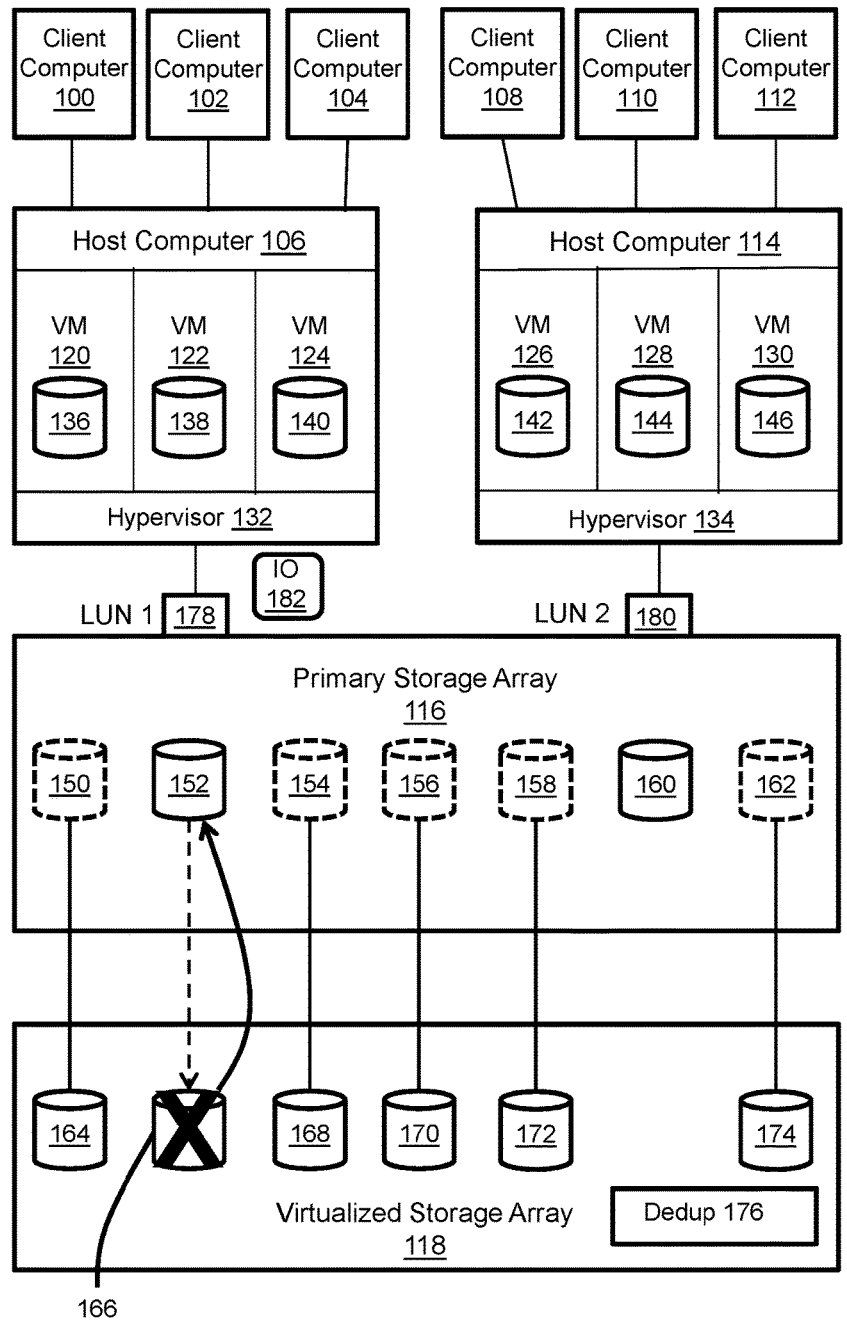
FIG. 1 illustrates a VDI environment in which VVOLs and deduplication are supported.

Specific examples may be presented in this detailed description in order to provide context and convey inventive concepts. The specific examples are not to be considered as limiting. Moreover, the features described herein may be combined in a wide variety of combinations.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, a virtual storage device could be based on multiple physical storage drives. The term "logic" is used to refer to special purpose physical circuit elements and software instructions that are stored on a non-transitory computer-readable medium and implemented by general-purpose tangible processors.

VDI (virtual desktop infrastructure) separates the desktop computing environment and desktop application software from the physical client computer. A guest OS (operating system) and application software run on a VM (virtual machine) on a server computer while being presented to a user on a remote client computer via a network. In one of a wide variety of examples VDI can be used to support thin client devices that lack the computing and memory resources required to support the OS and application software.

There may be significant data duplication in a VDI environment because multiple servers may each simultaneously support multiple copies of the same OS and application software. Further, with so many VMs in operation it may be desirable to perform storage operations including but not limited to snaps and clones at the VM level rather than, for example, creating a snap of a production device associated with multiple VMs. Deduplication algorithms can be used to reduce data redundancy. Deduplication algorithms operate by identifying relatively large portions of data sets, e.g. entire files or large chunks, which are identical, and then eliminate or reduce redundancy by replacing redundant copies with references such as pointers to a single stored copy. VVOLs (virtual volumes) can be used to enable VM level storage operations. VVOLs are logical volumes of storage that are uniquely associated with a particular PE (protocol Endpoint) and sub-address. Each PE is a logical IO proxy associated with a LUN ID (device number). A PE can be associated with a host computer, and a VM running on the host computer can be associated with a PE LUN ID/sub-address combination. Thus, each VVOL can exist and be managed on a storage array as a separate logical volume for a particular VM. In contrast, a traditional production device stores data associated with multiple VMs and the storage array has no knowledge of which data is associated with a particular VM. VVOLs may be implemented by configuring the storage array with Pes and assigning the sub-address fields to designate individual VVOLs among multiple VVOLs associated with the same storage container and LUN ID. However, not all storage arrays have both VVOL and deduplication capabilities.

FIG. 1 illustrates a VDI environment in which both VVOLs and deduplication are supported even though no single storage array supports both features. Client computers 100, 102, 104 use VDI and are supported by host computer 106. Client computers 108, 110, 112 use VDI and are supported by host computer 114. The host computers 106, 114 are supported by a primary storage array 116 with VVOL support capability (and lacking deduplication capability) and a virtualized storage array 118 with deduplication capability (and lacking VVOL capability). As will be explained in greater detail below, the virtualized storage array 118 provides deduplication for VVOLs of the primary storage array 116.

The host computers 106, 114 maintain a separate VM or container (hereafter "VM") for each supported client computer. Each VM provides the processing, volatile memory and non-volatile storage resources that are used to support the desktop computing environment, application software and other VDI for the associated client computer. In the illustrated example VM 120 supports client computer 100, VM 122 supports client computer 102, VM 124 supports client computer 104, VM 126 supports client computer 108, VM 128 supports client computer 110, and VM 130 supports client computer 112. In the illustrated example host computer 106 has a hypervisor or OS (hereafter "hypervisor") 132, and host computer 114 has a hypervisor 134. The hypervisors manage allocation of the processing, volatile memory and non-volatile storage resources to the VMs of their respective host computers based on an OS-container or hypervisor-VM model. The processing and volatile memory resources may be provided by physical components within the host computer. However, at least some of the non-volatile storage resources are provided by the primary storage array 116 and the virtualized storage array 118.

The non-volatile storage resources are presented within VMs as logical non-volatile storage devices that may each have a contiguous range of addresses from the perspective of the VM. In the illustrated example logical storage device 136 is presented to VM 120, logical storage device 138 is presented to VM 122, logical storage device 140 is presented to VM 124, logical storage device 142 is presented to VM 126, logical storage device 144 is presented to VM 128, and logical storage device 146 is presented to VM 130. Each logical storage device 136-146 may be an abstraction of one or more VVOLs that are managed by the primary storage array 116. In the illustrated example logical storage device 136 is an abstraction of VVOL 150, logical storage device 138 is an abstraction of VVOLs 152, 154, logical storage device 140 is an abstraction of VVOL 156, logical storage device 142 is an abstraction of VVOL 158, logical storage device 144 is an abstraction of VVOL 160, and logical storage device 146 is an abstraction of VVOL 162.

In response to an operation that accesses a logical storage device of a VM 120, 122, 124, the hypervisor 132 sends an IO 182 to the primary storage array 116. The 10 references a LUN ID corresponding to a PE (protocol endpoint) 178, where LUN (Logical Unit Number) is a number used to identify a logical storage volume in accordance with the SCSI (Small Computer System Interface) protocol. In the illustrated example LUN 1 corresponds to PE 178 and LUN 2 corresponds to PE 180. A sub-address field in the 10 specifies the VVOL to be accessed, e.g. VVOL 150. Thus, IOs from host computer 106 can individually reference each of the VVOLs 150, 152, 154, 156 containing data associated with the supported VMs 120, 122, 124 linked to PE 178. In response to the IO, the primary storage array accesses the VVOL data, e.g. VVOL 150 data, which resides locally on the virtualized storage array 118 In other words, the host computer 106 is accessing the VVOL 150 of the primary storage array but the data is on the virtualized storage array. In contrast, VVOL 152 data might be accessed within the primary storage array 116.

VVOL data is located on either the primary storage array 116 or the virtualized storage array 118 based on suitability of the data for duplication. When a VVOL is initially created a corresponding virtualized device (that is not a VVOL) is created on the virtualized storage array 118. In the illustrated example virtualized device 164 corresponds to VVOL 150, virtualized device 166 corresponds to VVOL 152, virtualized device 168 corresponds to VVOL 154, virtualized device 170 corresponds to VVOL 156, virtualized device 172 corresponds to VVOL 158 and virtualized device 174 corresponds to VVOL 162. The data associated with the virtualized device/VVOL pair is stored by the virtualized storage array 118. A deduplication program 176 running on the virtualized storage array 118 performs deduplication on the data. The deduplication program reduces the data by mitigating redundancy, e.g. and without limitation by using pointers in place of duplicate copies at the string, block, extent, chunk or other level. If data reduction through data deduplication satisfies predetermined criteria then the data continues to be maintained on the virtualized storage array. If data reduction through data deduplication fails to satisfy predetermined criteria then the data is moved to the primary storage array and the virtualized device is deleted from the virtualized storage array. In the illustrated example virtualized device 166 is being deleted from the virtualized storage array due to data failing to satisfy the predetermined criteria. The data of virtualized device 166 is first moved back to the primary storage array so that the data of VVOL 152 is locally maintained by the primary storage array. Virtualized device 166 is then deleted. VVOL 160 represents VVOL data that has already been located on the primary storage array based on failing to satisfy the predetermined criteria. Virtualized device 164 data contains VVOL data that satisfies the predetermined criteria. The predetermined criteria could be, for example and without limitation, a predetermined size reduction percentage or reduction ratio. In view of the above it should be apparent that VM data can be replicated, snapped, cloned and deduped at the VVOL level.

Figure 2:
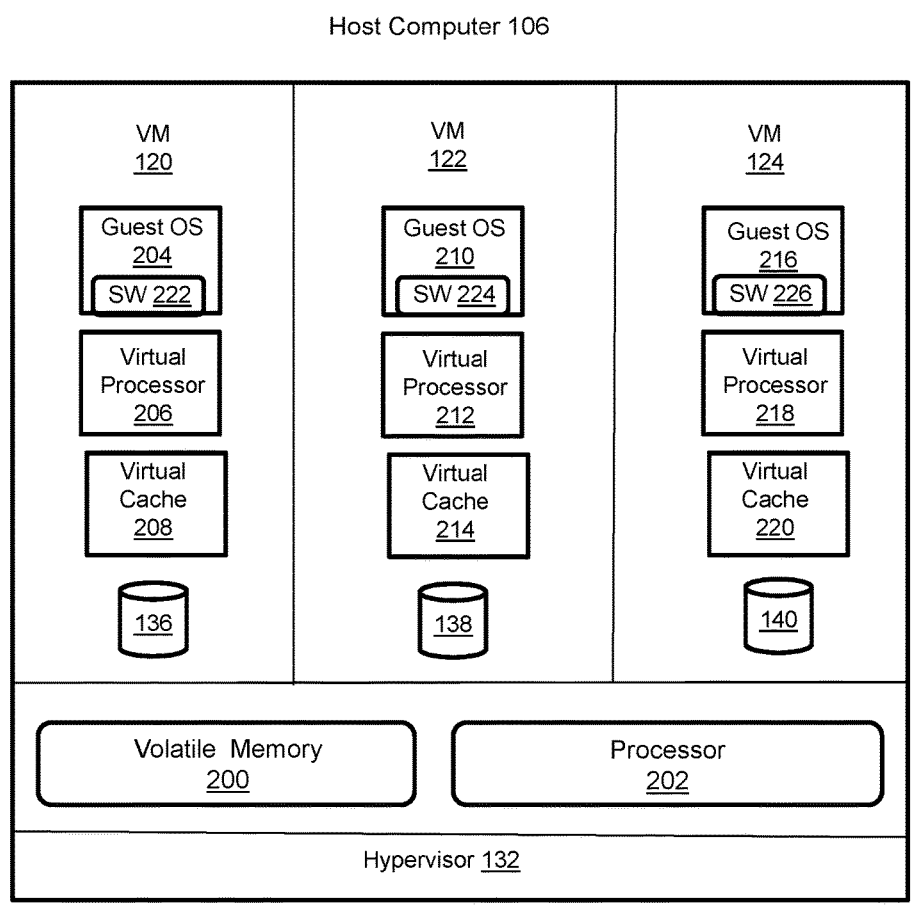
FIG. 2 illustrates the host computer in greater detail.

FIG. 2 illustrates the host computer 106 in greater detail. The host computer includes volatile memory 200 and processor 202. The volatile memory 200 may include, for example and without limitation, memory chips such as RAM (random access memory) components. The processor 202 may include, for example and without limitation, multi-core CPUs and GPUs on one or more IC (integrated circuit) chips. The hypervisor 132 allocates portions of the volatile memory and processor to the VMs 120, 122, 124. For example and without limitation, memory and processing resources may be allocated and shared on the basis of ranges of memory addresses, time-multiplexed CPU cycles and CPU threads. In the illustrated example the hypervisor 132 allocates virtual processor 206 and virtual cache 208 to VM 120, virtual processor 212 and virtual cache 214 to VM 122, and virtual processor 218 and virtual cache 220 to VM 124. Respective guest OSs 204, 210, 216 running in the VMs use the allocated resources. For example, guest OS 204 uses virtual processor 206, virtual cache 208 and logical storage device 136. Each guest OS is unaware of the existence of other guest OSs and resources beyond its VM. Instances of host application software 222, 224, 226 run on the guest OSs. The guest OSs and host application software instances provide the VDI for the client computers.

Figure 3:
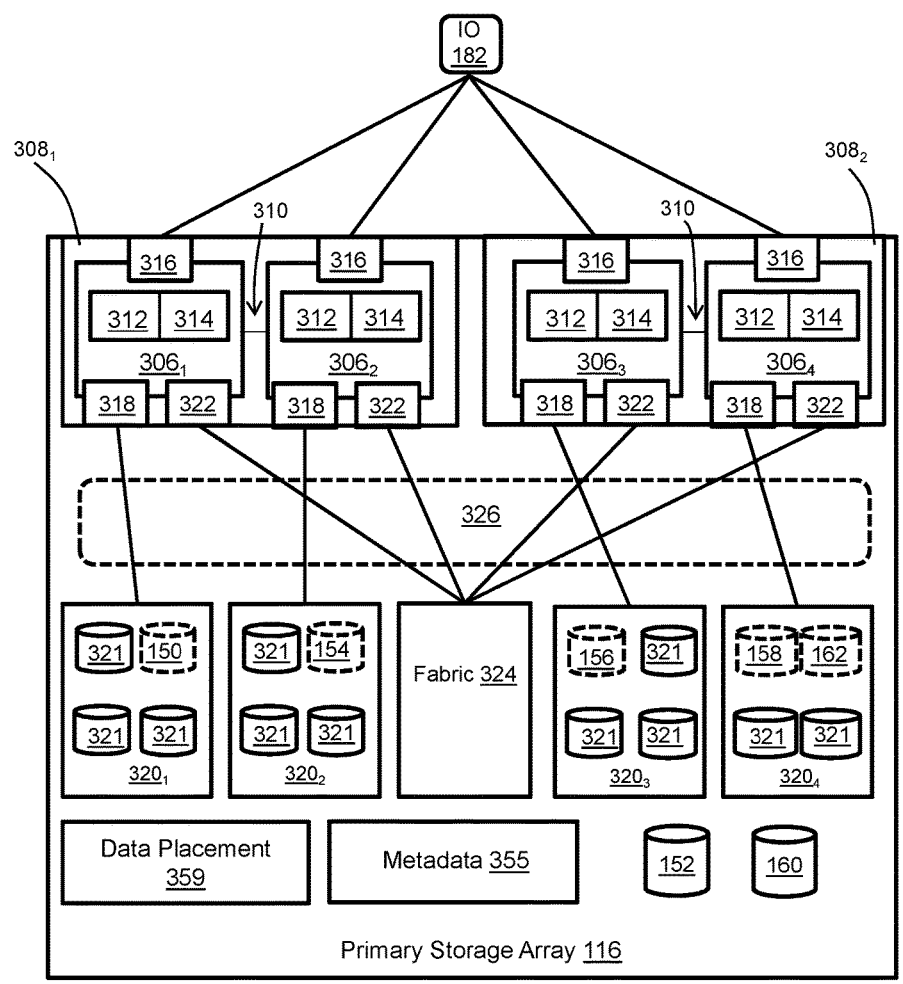
FIG. 3 illustrates the primary storage array in greater detail.

FIG. 3 illustrates the primary storage array 116 in greater detail. The architecture and components of the illustrated primary storage array are specifically designed for providing data storage services. However, the illustrated example is merely provided for context and the primary storage array, data backup storage array, and storage virtualization storage arrays could be implemented in a wide variety of different ways. In the specifically illustrated example the primary storage array 116 includes a plurality of computing nodes $306_1$-$306_4$ such as storage directors, for example and without limitation. Pairs of the computing nodes, e.g. ($306_1$, $306_2$) and ($306_3$, $306_4$), may be organized as storage engines $308_1$, $308_2$, respectively, for purposes of failover between computing nodes. The paired computing nodes of each storage engine may be directly interconnected by communication links 310. Each computing node includes at least one tangible multi-core processor 312 and a local (volatile memory) cache 314. The local cache 314 may include, for example and without limitation, volatile memory components such as RAM (random access memory). Each computing node may include one or more FEs 316 (front-end directors, a.k.a. front end adapters) for communicating with the host computers 106, 114. Each computing node $306_1$-$306_4$ may also include one or more BEs 318 (back end directors, a.k.a. back end adapters) for communicating with respective associated back end storage bays $320_1$-$320_4$, thereby enabling access to managed drives 321. The managed drives 321 include tangible non-volatile storage components of one or more technology types, for example and without limitation SSDs such as flash, and HDDs (hard disk drives) such as SAS (Serial Attached SCSI) HDDs, SATA (Serial Advanced Technology Attachment) and FC (Fibre Channel). Each computing node may also include one or more CAs (channel directors, a.k.a. channel adapters) 322 for communicating with other computing nodes via an interconnecting fabric 324. Each computing node may allocate a portion or partition of its respective local cache 314 to a virtual shared "global" cache 326 that can be accessed by other computing nodes, e.g. via DMA (direct memory access) or RDMA (remote direct memory access).

The VVOLs 152, 160 for which data is maintained on the primary storage array are backed by the managed drives 321. In other words, the data is stored on the managed drives 321. Metadata 355 provides a mapping between the VVOLs 152, 160 and the managed drives 321. For example, a contiguous set of addresses of a VVOL may map to non-contiguous addresses on one or more managed drives. The VVOLs 150, 154, 156, 158, 162 (FIG. 1) for which data is maintained on the virtualized storage array are virtualized managed drives (also shown with reference numbers 150, 154, 156, 158, 162). Data placement program 359 determines whether a VVOL should reside on the primary storage array or the virtualized storage array based on deduplication information provided by the virtualized storage array.

In order to service IOs, e.g. IO 182, the primary storage array uses metadata 355 that indicates, among various things, mappings between VVOLs and the locations of extents of host application data and guest OS data on the managed drives 321 and virtualized managed drives 150, 154, 156, 158, 162. For example, a contiguous set of addresses of VVOL 152 may map to non-contiguous addresses on one or more managed drives 321. In response to a read IO the primary storage array uses the metadata 355 to locate the requested data, e.g. in the shared cache 326, managed drives 321 or virtualized managed drives. If the requested data is not in the shared cache then it is temporarily copied into the shared cache from the managed drives or virtualized managed drives and sent to the host application via one of the computing nodes. In the case of a write IO the primary storage array creates new metadata that maps the VVOL address with a location to which the data is written on the managed drives or virtualized managed drives. The shared cache 326 may enable the VVOLs to be reachable via all of the computing nodes and paths.

Figure 4:
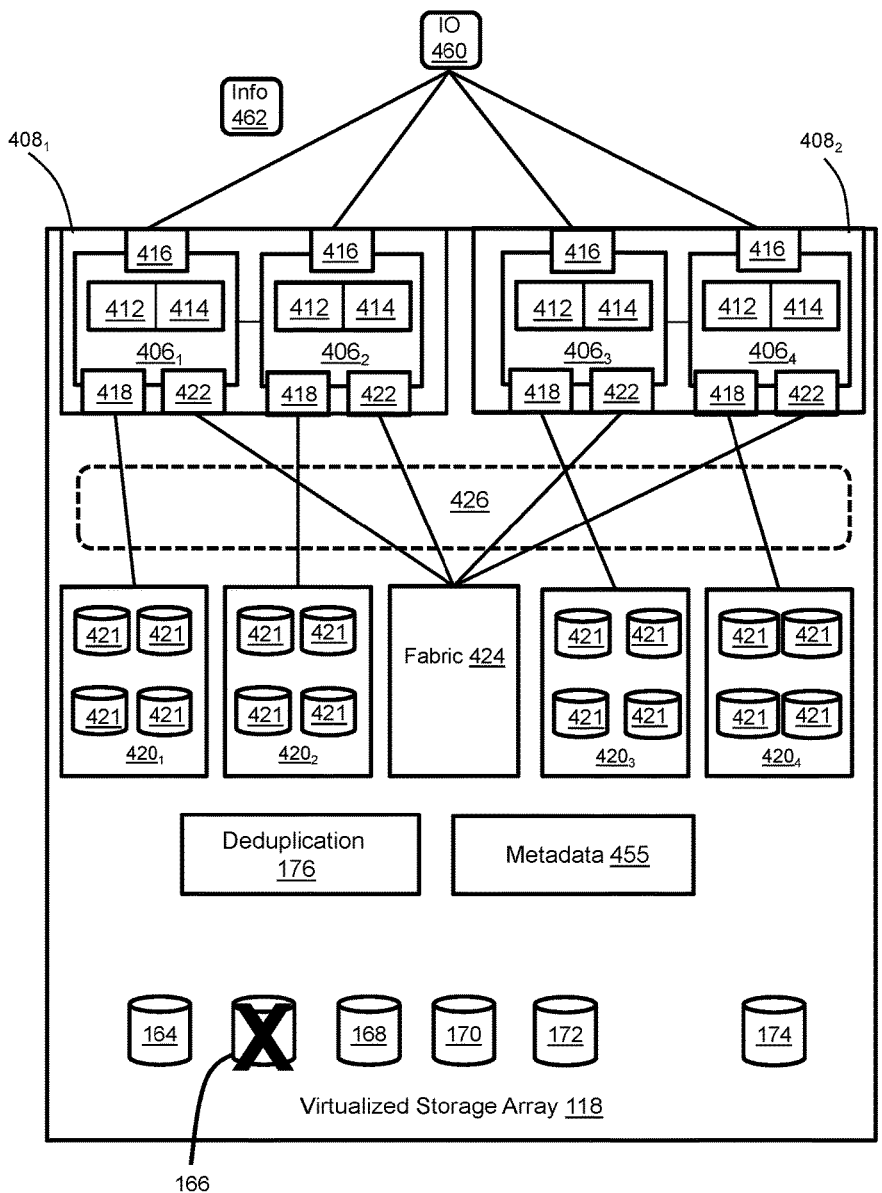
FIG. 4 illustrates the virtualized storage array in greater detail.

FIG. 4 illustrates the virtualized storage array 118 in greater detail. The virtualized storage array may be a conventional storage array with computing nodes 406$_1$-406$_4$, storage engines 408$_1$, 408$_2$, tangible multi-core processors 412, local cache 414, FEs 416, BEs 418, fabric 424, shared cache 426, managed drives 421 and other features such as metadata 455 and storage bays 420$_1$-420$_4$. The storage virtualization storage array 118 maintains virtualized devices 164, 166, 168, 170, 172, and 174 on managed drives 421. The primary storage array accesses VVOL data from the virtualized storage array by sending IOs to the computing nodes via one of the FEs 416. For example, IO 460 could be used to access data associated with VVOL 150 by referencing the corresponding virtualized device 164. The computing nodes use the metadata 455 to locate the corresponding addresses in the managed drives 421. The IO is then processed in a conventional manner, e.g. using the shared cache and managed drives. Deduplication program 176 dedupes the data and provides data reduction information 462 to the primary storage array so that the data placement program 359 (FIG. 3) can make data placement decisions based on data deduplication. For example, info 462 may include reduction ratio for a virtualized device that is used by the data placement program to determine whether the associated data satisfies the predetermined criteria and should be maintained on the virtualized storage array or the primary storage array.

Figure 5:
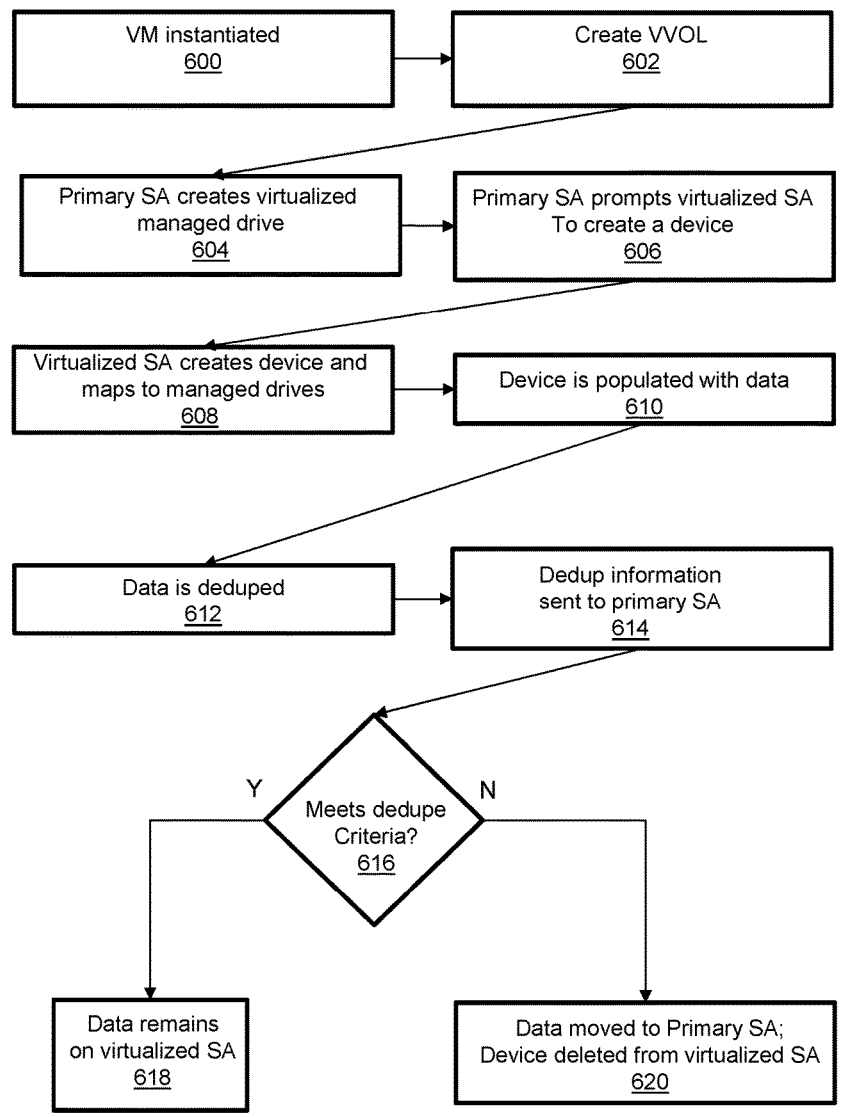
FIG. 5 illustrates a technique in accordance with aspects of FIGS. 1 through 4.

FIG. 5 illustrates a technique in accordance with aspects of FIGS. 1 through 4. Initially, a VM is instantiated with a memory and storage allocation as indicated in block 600. For example and without limitation, a user may prompt instantiation of a new VM with 3 GB of volatile memory and 1 TB of non-volatile storage. A VVOL is then created in the primary storage array as indicated in block 602. The created VVOL is associated with a PE and sub-address. The PE and sub-address are associated with the VM. The primary storage array creates a virtualized managed drive corresponding to the VVOL as indicated in block 604. The primary storage array prompts the virtualized storage array to create a corresponding logical device as indicated at block 606. The virtualized storage array creates the logical device and maps the logical device to managed drives as indicated at block 608, thereby providing non-volatile storage for the VM. The logical device is then populated with at least some data as indicated at block 610. In other words, the host application and/or guest OS data is written to the managed drives on the virtualized storage array. The deduplication algorithm on the virtualized storage array dedupes the data as indicated at block 612. Dedupe information is then sent from the virtualized storage array to the primary storage array as indicated in block 614. The dedupe information may include size reduction percentage or reduction ratio, among a variety of information. After some period of time, amount of data written or some other condition, if the dedupe information meets the predetermined criteria as determined in block 616 then the data remains on the virtualized storage array as indicated in block 618. If the information fails to meet the predetermined criteria as determined in block 616 then the data is moved to the primary storage array and the logical device is deleted from the virtualized storage array as indicated in block 620. The analysis may be repeated as the VVOL is populated with more data and changes over time.

A number of features, aspects, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a primary storage array comprising:
     a plurality of computing nodes;
     a plurality of managed drives, each managed drive comprising non-volatile storage;
     at least one protocol endpoint associated with a device number; and
     a virtual volume of storage that is uniquely associated with a protocol endpoint of the primary storage array and a sub-address, the protocol endpoint having a device number, the device number and the sub-address uniquely associated with a virtual machine running on a host computer such that the device number and the sub-address distinguish the virtual volume of storage from other virtual volumes of storage associated with the device number; and
   a virtualized storage array comprising:
     a plurality of computing nodes;
     a plurality of managed drives, each managed drive comprising non-volatile storage;
     a deduplication algorithm; and
     a virtualized device that is backed by the managed drives of the virtualized storage device;
   wherein data of the virtual volume of storage is maintained on the virtualized device and deduped by the deduplication algorithm.

2. The apparatus of claim 1 comprising deduplication information that is provided to the primary storage array by the virtualized storage array, the deduplication information indicative of suitability of the data for deduplication.

3. The apparatus of claim 2 comprising a data placement program running on the primary storage array, the data placement program using the deduplication information to determine whether to maintain the data on the virtualized storage array or the primary storage array.

4. The apparatus of claim 3 wherein the deduplication information comprises at least one of size reduction percentage and reduction ratio.

5. The apparatus of claim 3 wherein the data remains on the virtualized storage array because the deduplication information satisfies predetermined criteria.

6. The apparatus of claim 3 wherein the data is moved to the primary storage array because the deduplication information fails to satisfy predetermined criteria.

7. The apparatus of claim 6 wherein the logical device is deleted from the virtualized storage array.

8. A method comprising:
creating, on a primary storage array, a virtual volume of storage that is uniquely associated with a protocol endpoint of the primary storage array and a sub-address, the protocol endpoint having a device number, the device number and the sub-address uniquely associated with a virtual machine running on a host computer such that the device number and the sub-address distinguish the virtual volume of storage from other virtual volumes of storage associated with the device number;
storing data of the virtual volume of storage on a virtualized device of a virtualized storage array; and
processing the data in the virtualized storage array with a deduplication algorithm.

9. The method of claim 8 comprising providing deduplication information to the primary storage array by the virtualized storage array, the deduplication information indicative of suitability of the data for deduplication.

10. The method of claim 9 comprising a data placement program running on the primary storage array using the deduplication information to determine whether to maintain the data on the virtualized storage array or the primary storage array.

11. The method of claim 10 comprising causing the data to remain on the virtualized storage array in response to the deduplication information satisfying predetermined criteria.

12. The method of claim 10 comprising causing the data to be moved from the virtualized storage array to the primary storage array in response to the deduplication information failing to satisfy predetermined criteria.

13. The method of claim 12 comprising deleting the logical device from the virtualized storage array after moving the data.

14. An apparatus comprising:
a host computer comprising a plurality of virtual machines, each virtual machine supporting a guest operating system that is part of a virtual desktop infrastructure for a client computer;
a primary storage array comprising:
a plurality of computing nodes;
a plurality of managed drives, each managed drive comprising non-volatile storage;
at least one protocol endpoint associated with a device number; and
a virtual volume of storage that is uniquely associated with a protocol endpoint of the primary storage array and a sub-address, the protocol endpoint having a device number, the device number and the sub-address uniquely associated with a virtual machine running on a host computer such that the device number and the sub-address distinguish the virtual volume of storage from other virtual volumes of storage associated with the device number; and
a virtualized storage array comprising:
a plurality of computing nodes;
a plurality of managed drives, each managed drive comprising non-volatile storage;
a deduplication algorithm; and
a virtualized device that is backed by the managed drives of the virtualized storage device;
wherein guest operating system data of the virtual volume of storage is maintained on the virtualized device and deduped by the deduplication algorithm.

15. The apparatus of claim 14 comprising deduplication information that is provided to the primary storage array by the virtualized storage array, the deduplication information indicative of suitability of the guest operating system data for deduplication.

16. The apparatus of claim 15 comprising a data placement program running on the primary storage array, the data placement program using the deduplication information to determine whether to maintain the guest operating system data on the virtualized storage array or the primary storage array.

17. The apparatus of claim 16 wherein the deduplication information comprises at least one of size reduction percentage and reduction ratio.

18. The apparatus of claim 16 wherein the guest operating system data remains on the virtualized storage array because the deduplication information satisfies predetermined criteria.

19. The apparatus of claim 16 wherein the guest operating system data is moved to the primary storage array because the deduplication information fails to satisfy predetermined criteria.

20. The apparatus of claim 19 wherein the logical device is deleted from the virtualized storage array.

* * * * *